(12) United States Patent
Massicotte

(10) Patent No.: US 9,417,947 B1
(45) Date of Patent: Aug. 16, 2016

(54) SYSTEM AND METHOD FOR ROBUST STORAGE OF ERROR EVENT INFORMATION

(71) Applicant: Twitter, Inc., San Francisco, CA (US)

(72) Inventor: Matthew Massicotte, Quincy, MA (US)

(73) Assignee: TWITTER, INC., San Francisco, CA (US)

( * ) Notice: Subject to any disclaimer, the term of this patent is extended or adjusted under 35 U.S.C. 154(b) by 78 days.

(21) Appl. No.: 14/210,685

(22) Filed: Mar. 14, 2014

Related U.S. Application Data

(60) Provisional application No. 61/791,234, filed on Mar. 15, 2013.

(51) Int. Cl.
*G06F 11/00* (2006.01)
*G06F 11/07* (2006.01)

(52) U.S. Cl.
CPC ........ *G06F 11/0769* (2013.01); *G06F 11/0778* (2013.01); *G06F 11/0787* (2013.01)

(58) Field of Classification Search
CPC ............ G06F 11/0706; G06F 11/0736; G06F 11/0742; G06F 11/0751; G06F 11/0763; G06F 11/0766; G06F 11/0769; G06F 11/0775; G06F 11/0778; G06F 11/0787
USPC ...................................................... 714/38.11
See application file for complete search history.

(56) References Cited

U.S. PATENT DOCUMENTS

| | | | | |
|---|---|---|---|---|
| 6,728,735 B1* | 4/2004 | Fong | ................... | G06F 11/1471 707/642 |
| 6,763,517 B2* | 7/2004 | Hines | ................... | G06F 8/66 714/48 |
| 7,411,821 B2* | 8/2008 | Rudelic | ............... | G06F 12/1433 365/185.04 |
| 7,496,794 B1* | 2/2009 | Eastham | ............. | G06F 11/0778 714/37 |
| 7,818,616 B2* | 10/2010 | Kathail | ............... | G06F 11/0778 713/1 |
| 8,086,909 B1* | 12/2011 | Liu | ..................... | G06F 11/0727 714/11 |
| 8,392,695 B1* | 3/2013 | Lachwani | ........... | G06F 11/0742 713/1 |
| 8,583,960 B2* | 11/2013 | Settsu | ................. | G06F 11/0778 714/11 |
| 2010/0095157 A1* | 4/2010 | Aoyama | ............. | G06F 11/0751 714/37 |
| 2013/0152050 A1* | 6/2013 | Chang | ................. | G06F 11/0742 717/125 |
| 2015/0106661 A1* | 4/2015 | Cardona | ............. | G06F 11/0778 714/45 |

* cited by examiner

*Primary Examiner* — Joseph Kudirka
(74) *Attorney, Agent, or Firm* — Cesari and McKenna, LLP

(57) ABSTRACT

A system and method for robust storage of error event information is provided. Binary image information is stored in a compressed data structure in a read only portion of memory. In the event of an error condition, state information is written to a file in a series of carriage return delineated lines.

20 Claims, 9 Drawing Sheets

| 705 → | VERSION 710 | # LINES 715 | 720 ••• | CR 725 |
| --- | --- | --- | --- | --- |
| 730 → | BUILD INFORMATION 735 | | | CR 725 |
| 740 → | PROCESS INFORMATION 745 | | | CR 725 |
| 750 → | HOST INFORMATION 755 | | | CR 725 |
| | ⋮ | | | CR 725 |
| 760 → | STORAGE 765 | FREE 770 | TOTAL 775 | 780 ••• | CR 725 |
| | ⋮ 785 | | | CR 725 |

SYSTEM AND METHOD FOR ROBUST STORAGE OF ERROR EVENT INFORMATION

CROSS-REFERENCE TO RELATED APPLICATIONS

This application claims priority under 35 U.S.C. §119(e) to U.S. provisional Patent Application Ser. No. 61/791,234, filed on Mar. 15, 2013 and entitled "System and method For Robust Storage of Error Event Information." U.S. Provisional Patent Application Ser. No. 61/791,234 is incorporated herein by reference in its entirety.

BACKGROUND OF THE INVENTION

Software errors often cause undesirable crashes or other failures of applications executing on mobile devices. Application developers may incorporate crash monitoring procedures into their applications. Such crash monitoring procedures may attempt to gather state information relating to the mobile device at the time of the crash or other error event in order to provide information for debugging purposes. However, as the application has failed by the time that the crash monitoring procedures are invoked, the mobile device may not be stable and obtaining useful information may be problematic.

SUMMARY OF THE INVENTION

The disadvantages of the prior art are overcome by providing a system and method for the robust storage of error event information. When an application executing on a mobile device is executed, information relating to the binary images (libraries) utilized by the application is stored in a binary image information data structure in a compressed format in a read only portion of memory. In the event of an error condition that triggers an analytic software within an application, the analytic software stores state information in a series of carriage returned delineated lines of machine readable data in a file within storage of the mobile device. The lines are illustratively written in descending order of importance to ensure that, should a second error condition occur, the most important information for debugging purposes will have been retained. Further, by writing lines that are delineated by a predefined character (e.g., a carriage return), in the event of a second and fatal error condition, it is possible to retrieve at least a portion of the structured state information

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 is a schematic block diagram of an exemplary state information data structure in accordance with an illustrative embodiment of the present invention;

DETAILED DESCRIPTION OF AN ILLUSTRATIVE EMBODIMENT

A computer network is a geographically distributed collection of entities interconnected by communication links and segments for transporting data between end nodes, such as personal computers and workstations. Many types of networks are available, with the types ranging from Wi-Fi networks, cell phone networks, local area networks (LANs) to wide area networks (WANs). Wi-Fi is a mechanism for wirelessly connecting a plurality of electronic devices (e.g., computers, cell phones, etc.). A device enabled with Wi-Fi capabilities may connect to the Internet via a wireless network access point, as known by those skilled in the art. Cellular networks are radio network distributed over land areas called "cells", wherein each cell may be served by at least one fixed-location transceiver known as a cell site or base station. When joined together, these cells may provide radio coverage over a wide geographic area. As known by those skilled in the art, this may enable a large number of portable transceivers (e.g., mobile phones) to communicate with each other. LANs typically connect the entities over dedicated private communications links located in the same general physical location, such as a building or campus. WANs, on the other hand, typically connect geographically dispersed entities over long-distance communications links, such as common carrier telephone lines, optical light paths, synchronous optical networks (SONET), or synchronous digital hierarchy (SDH) links. The Internet is an example of a WAN that connects disparate networks throughout the world, providing global communication between entities on various networks. The entities typically communicate over the network by exchanging discrete frames or packets of data according to predefined protocols, such as the Transmission Control Protocol/Internet Protocol (TCP/IP), Hypertext Transfer Protocol (HTTP). In this context, a protocol consists of a set of rules defining how the entities interact with each other and how packets and messages are exchanged.

Figure 1:
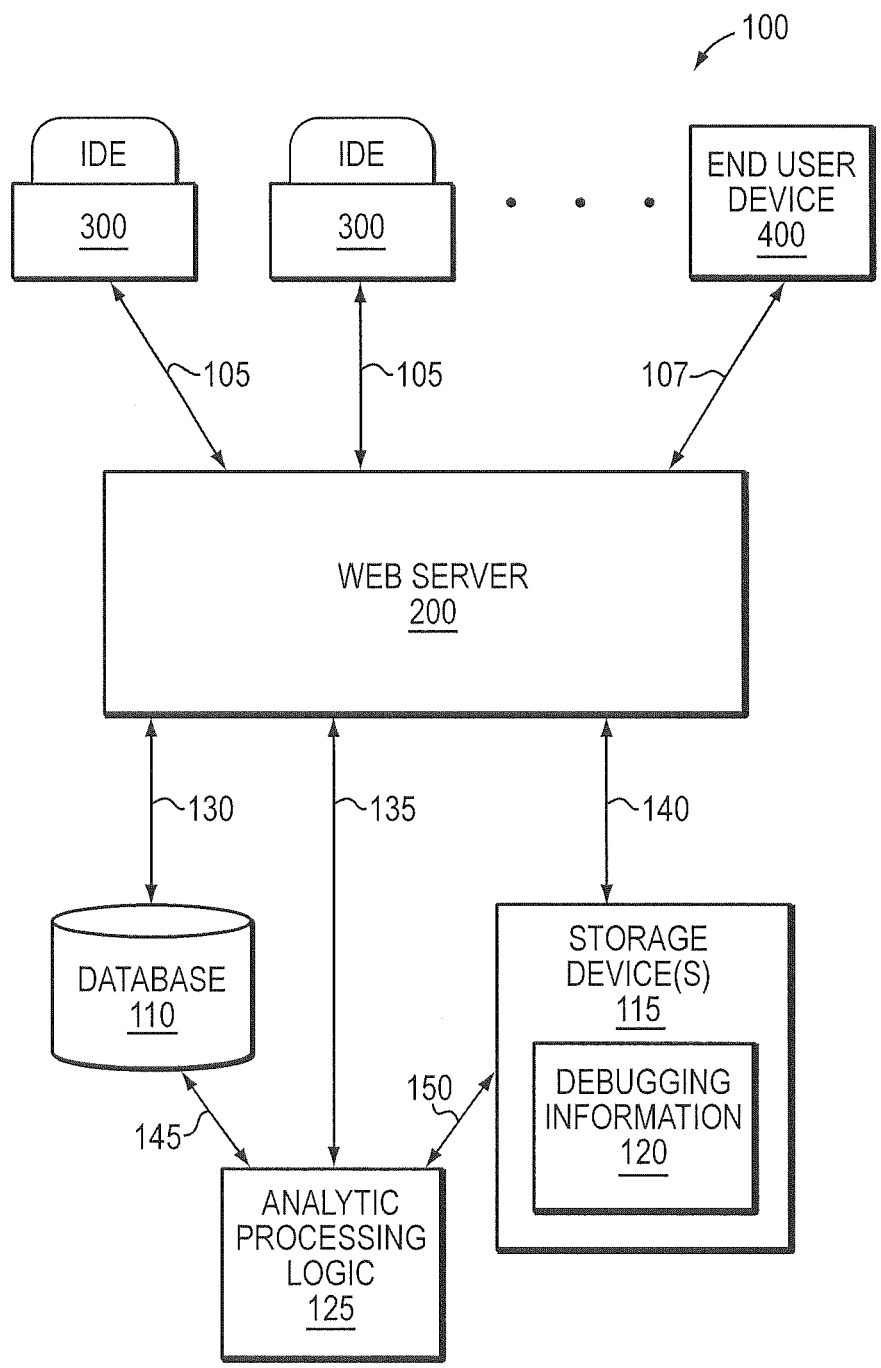
FIG. 1 is a schematic block diagram of an exemplary computing environment in accordance with an illustrative embodiment of the present invention.

FIG. 1 is a schematic block diagram of an exemplary computing environment 100 in accordance with an illustrative embodiment of the present invention. Specifically, the computing environment 100 may include one or more integrated development environments (IDE) 300 coupled to one or more web servers 200 (managed by an analytic service provider), interconnected by one or more communication links 105.

Figure 2:
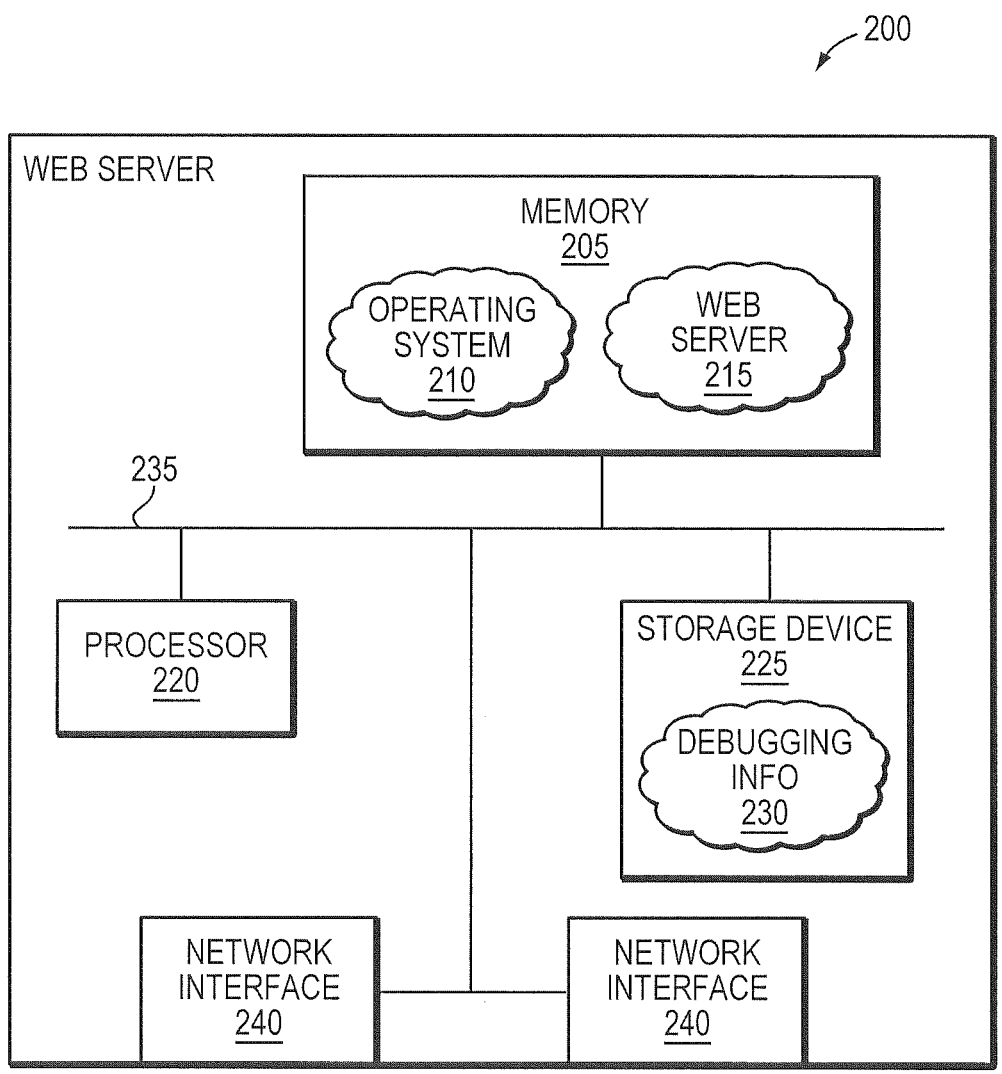
FIG. 2 is a schematic block diagram of an exemplary web server in accordance with an illustrative embodiment of the present invention.
Figure 3:
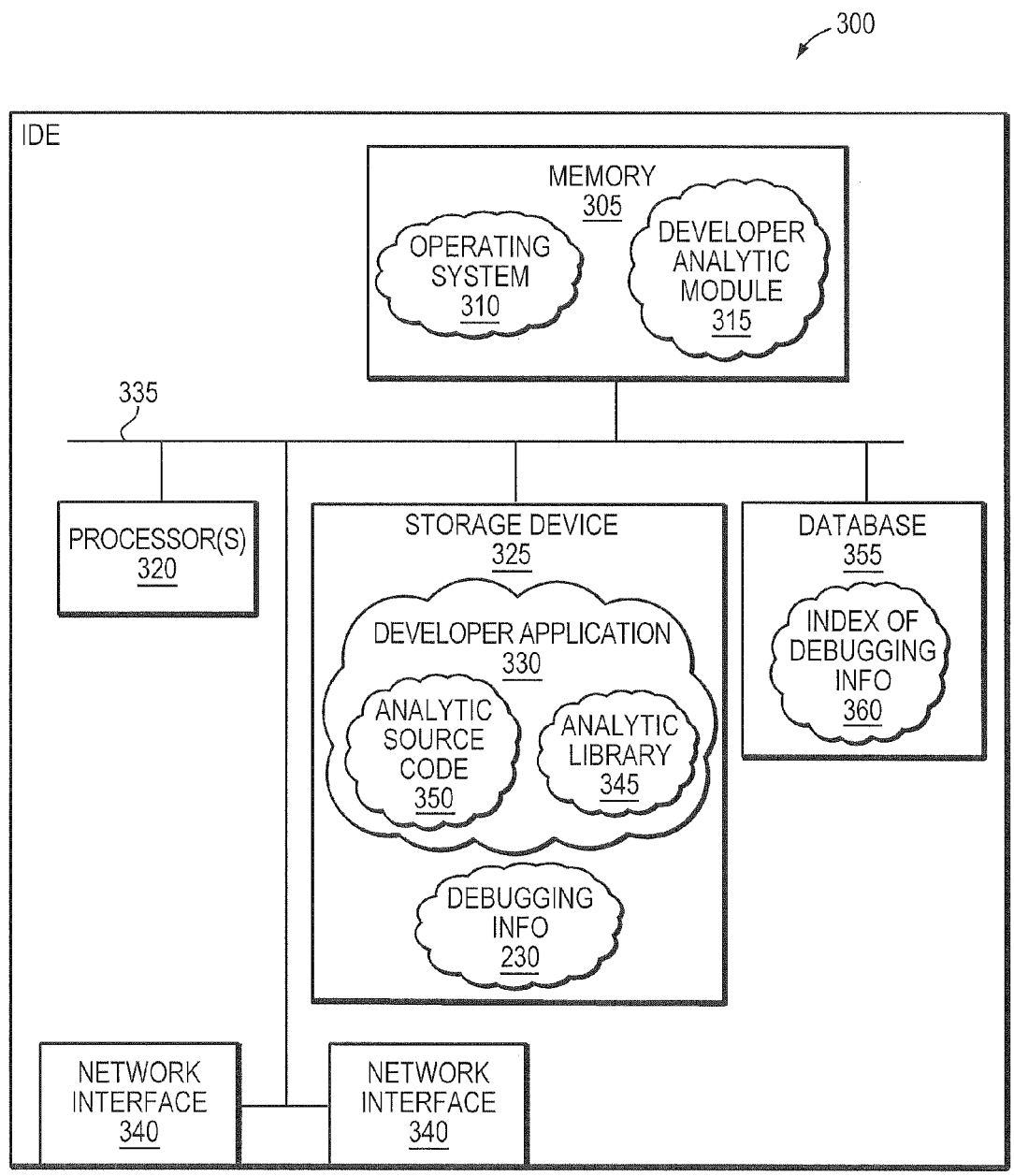
FIG. 3 is a schematic block diagram of an exemplary IDE in accordance with an illustrative embodiment of the present invention.

Developer IDE 300, described further below in reference to FIG. 3, represent development environments utilized by application developers for creation of source code to be compiled, or otherwise built, to generate applications to be distributed for execution on end user device 400. Illustratively, IDE 300 may implement an Xcode development environment. As known by those skilled in the art, Xcode is a suite of tools for developing software on a Macintosh (MAC) Operating System X (OS), developed by Apple Inc. While the present invention is described in relation to IDE 300 utilizing Xcode, it should be noted that the teaching of the present invention may be utilized with any development environment. As such, all references to Xcode and/or Mac OS should be taken as exemplary only. Web server 200, described further below in reference to FIG. 2, is illustratively utilized to enable distribution of the analytic software to IDE 300, collection of data from IDE 300 and end user device 400, as well as provides proper message passing among the various entities in environment 100. Illustratively, the web server 200 may be hosted or managed by an analytic processing provider. As used herein, an analytic processing provider is a service provider that manages, collects and analyzes information relating to error and/or state information to aid in debugging and error correction of applications.

Further, end user device 400, database 110, analytic processing logic 125, and storage device(s) 115 may be coupled to web servers 200 via communication link(s) 107, 130, 135, 140, 145, and 150, respectively. Storage device(s) 115 may for example store debugging information (e.g., dSYM file), among other data associated with the IDE 300 and end user device 400. End user device 400, described further below in reference to FIG. 4, may comprise any device capable of executing applications. Illustratively, end user device 400 may comprise a smart phone, a personal digital assistant and/or a tablet computer. Exemplary smart phones may utilize the Android operating system, available from Google, Inc., and/or the iOS system, available from Apple, Inc. It should be noted that other smart phones may be utilized in alternative embodiments. As such, the description herein directed to development for iOS systems should be taken as exemplary only.

It is noted that links 105, 107, 130, 135, 140, 145, and 150 are depicted in FIG. 1 as separate and individual links for simplicity purposes, and that communications between the devices may occur over a single link (e.g., Internet), a plurality of links, or virtual links as know by those skilled in the art. Moreover, one or more web servers 200, database 110, analytic processing logic 125, and storage device(s) 115 may all reside on a single device, or a plurality of devices, and managed by the analytic service provider. The devices are shown as separate entities in FIG. 1 for simplicity purposes. Further, those skilled in the art will understand that any number of devices and/or links may be used in the computer environment, and that the view shown herein is for simplicity.

FIG. 2 is a schematic block diagram of an exemplary web server 200 in accordance with an illustrative embodiment of the present invention. The web server 200 may comprise a plurality of network interfaces 240, one or more processors 220, storage device 225, and a memory 205 interconnected by a system bus 235. The network interfaces 240 contain the mechanical, electrical, and signaling circuitry for communicating data over physical links coupled to a network, such as links 105, 107, 130, 135, 145, and 140. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, known to those skilled in the art.

The memory 205 comprises a plurality of locations that are addressable by the processor(s) 220 and the network interfaces 240 for storing software programs and data structures associated with the embodiments described herein. The processor 240 may comprise necessary elements or logic adapted to execute the software programs and manipulate the data structures. An operating system 210, portions of which are typically resident in memory 205 and executed by the processor(s), functionally organizes the web server 200 by, inter alia, invoking network operations in support of software processes and/or services executing on the web server. A web server 215, portions of which are typically resident in memory 205 are executed by the processor(s), functionally store and execute logical commands inputted by the analytic service provider and developers. For example, web server 215 may implement a website managed by the analytic service provider, wherein developer may access that web site to obtain pertinent information associated with their applications and information associated with bugs incurred on the developer's application executing on an end user device. It should be noted that any system for distribution of the analytic software, collection of debugging information and crash data, etc. may be utilized. As such, the description of a web server should be taken as exemplary only. In alternative embodiments, the various functionalities may be distributed among a plurality of servers. As such, the description of a single web server 200 should be taken as exemplary only.

A storage device 225 may store debugging information 230, such as a dSYM file, that is sent, for example automatically, over the communication links from an IDE. Those skilled in the art will understand that a dSYM file may contain a plurality of mappings between memory offsets, such as addresses, and method names and line numbers associated with the built/compiled application created by the developer. The structure and information relating to a dSYM file and the functions associated therewith are well-known and described in more detail in "DWARF Debugging Information Format," dated Jul. 27, 1993, the contents of which are hereby incorporated by reference. It should be noted that in alternative embodiments, debugging information may be stored in differing formats other than dSYMs. For example, when developing for an Android based end user device, debugging information may be stored in a well-known de-obsfuscation (de-ob) data container (file) such as that generated by the Proguard software that is available under the GPL. As such, the description of using dSYM files should be taken to be exemplary only. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

FIG. 3 is a schematic block diagram of an exemplary IDE 300 in accordance with an illustrative embodiment of the present invention. The IDE may comprise a plurality of network interfaces 340, one or more processors 320, a memory 305, a storage device 325, and database 355 interconnected by a system bus 335. The network interfaces 340 contain the mechanical, electrical, and signaling circuitry for communicating data over physical links coupled to a network, such as links 105, 107, 130, 135, 140, 145, and 150. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 340 may also be used to implement one or more virtual network interfaces, such as for Virtual Private Network (VPN) access, known to those skilled in the art.

The memory 305 comprises a plurality of locations that are addressable by the processor(s) 320 and the network interfaces 340 for storing software programs and data structures associated with the embodiments described herein. The processor 340 may comprise necessary elements or logic adapted to execute the software programs and manipulate the data structures. An operating system 310, portions of which are typically resident in memory 305 and executed by the processor(s), functionally organizes the IDE by, inter alia, invoking network operations in support of software processes and/or services executing on the web server.

A developer analytic module 315, that is associated with the analytic service provider, portions of which are typically resident in memory 305 are executed by the processor(s), may functionally be installed onto IDE 300 by a user, such as a developer. The analytic module 315 may, for example, assist in gathering debugging information 230 associated with the developer's application on IDE 300. In accordance with various embodiments of the present invention, the developer analytic module 315 may perform various functions to aid in the development of applications by aiding the integration of the IDE with the analytic service provider. These various functions, described further below, help to ensure that the IDE is utilizing the most up to date SDK and to ensure that any necessary files, e.g., dSYMs are transferred to the web server, etc.

A storage device 325 may store debugging information 230, such as a dSYM file, that is associated with application 330 of the developer. Further, storage device 325 may also store the application 330 of the developer that may be written and compiled on IDE 300 by a developer, for example. An analytic library 345 and analytic source code 350, that are associated with an analytic service provider, may be installed/incorporated within application 330 of the developer through use of an analytic installer.

Database 355, is illustratively configured to store an index of the debugging information 360 that may be gathered by developer analytic module 315. For example, database 355 may store an index of a URL of a dSYM file by an identifier, e.g., a universally unique identifier (UUID), associated with the debugging information 230. In an illustrative embodiment, database 355 may be implemented using the well-known SQLite database, however, it should be noted that in alternative embodiments any type of data structure that permits indexing, including, e.g., hash tables, etc., may be used. As such, the description of a database should be taken as exemplary only. Also, while the embodiments herein are described in terms of processes or services stored in memory, alternative embodiments also include the processes described herein being embodied as modules consisting of hardware, software, firmware, or combinations thereof.

Figure 4:
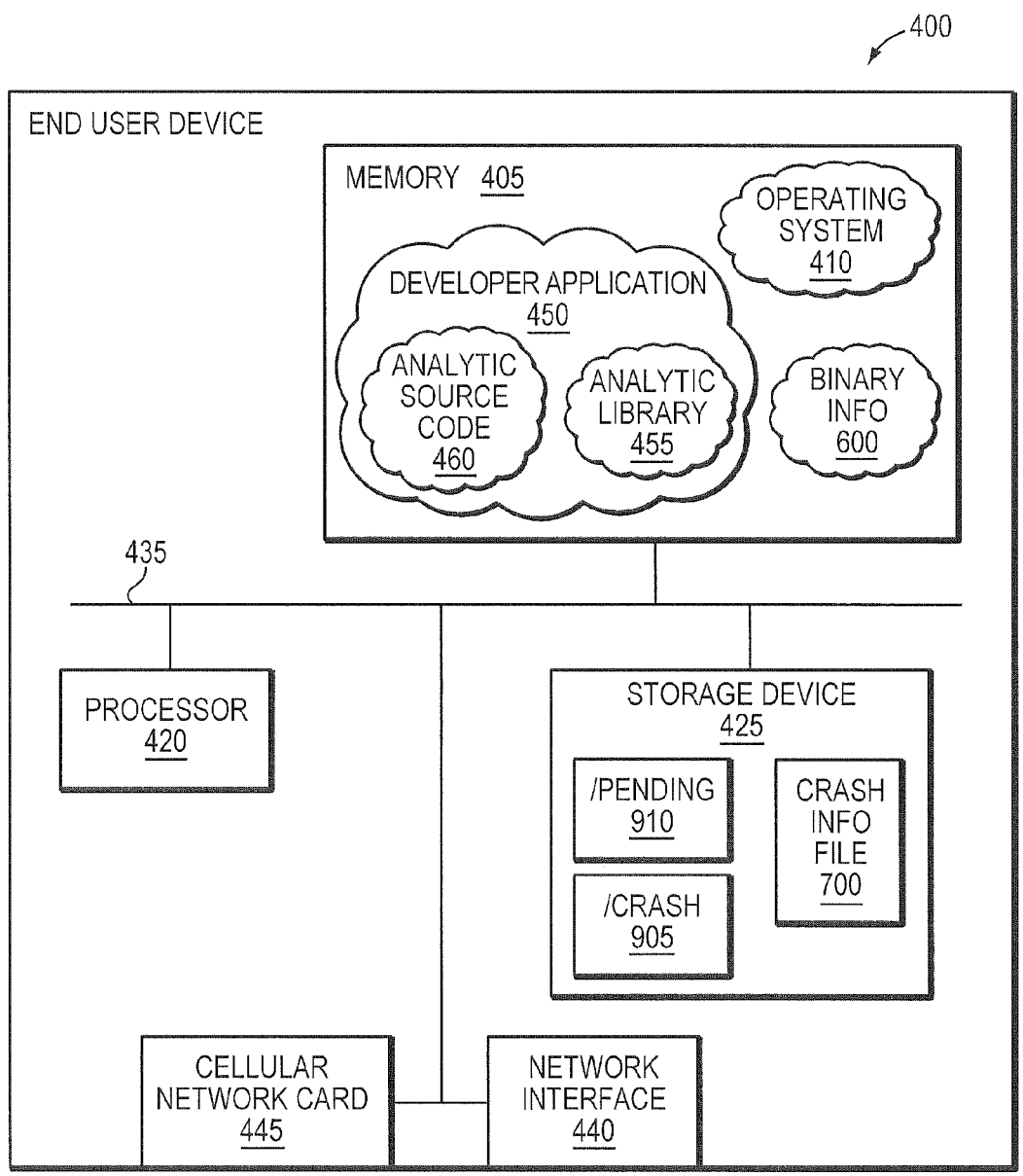
FIG. 4 is a schematic block diagram of an exemplary end user device in accordance with an illustrative embodiment of the present invention.

FIG. 4 is a schematic block diagram of an exemplary end user device 400 in accordance with an illustrative embodiment of the present invention. End user device 400 may comprise any device capable of executing applications. Illustratively, end user devices 400 may comprise a smart phone, a personal digital assistant and/or a tablet computer. Exemplary smart phones may utilize the Android operation system, available from Google, Inc., and/or the iOS system, available from Apple, Inc. It should be noted that other smart phones may be utilized in alternative embodiments. As such, the description herein directed to the development for iOS systems should be taken as exemplary only. The end user device may comprise network interfaces 440, one or more processors 420, a memory 405, a storage device 425, and a cellular network card 445 interconnected by a system bus 435. The network interfaces 440 and cellular network 445 contain the mechanical, electrical, and signaling circuitry for communicating data over physical links coupled to a network, such as links 105, 107, 130, 135, 140, 145, and 150. The network interface 440 and cellular network card 445 may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 440 may also be used to implement one or more virtual network interfaces, such as for Virtual Private Network (VPN) access, known to those skilled in the art.

The memory 405 comprises a plurality of locations that are addressable by the processor(s) 420 and the network interfaces 440 for storing software programs and data structures associated with the embodiments described herein. The processor 420 may comprise necessary elements or logic adapted to execute the software programs and manipulate the data structures. An operating system 410, portions of which are typically resident in memory 405 and executed by the processor(s), functionally organizes the end user device by, inter alia, invoking network operations in support of software processes and/or services executing on the web server. An application 450, that may have been created by a developer on an IDE, and portions of which are typically resident in memory 405, are executed by the processor(s). Application 450 may be downloaded or installed on end user device 400 in any manner known to those skilled in the art. Further, application 450 includes analytic library 455 and analytic source code 460 that may have been incorporated within application 450 on IDE 300 by the developer.

Also included within memory 405 is a set of binary image information 600, described further below in reference to FIG. 6. In accordance with an illustrative embodiment of the present invention, the analytic library 455 and/or analytic source code 460 within application 450 stores information relating to binary images, i.e., binary libraries or other modules that may be utilized by the application 450, in a binary image data structure 600. Illustratively, the region of memory where the binary image information 600 is stored is marked as read only with the operating system 410. This provides some degree of protection in the event of an error occurring in the application 450 as the operating system should prevent the application from overwriting or otherwise damaging the contents of the binary image information data structure 600.

The storage device 425 illustratively contains a /pending and a /crash directory. In accordance with an illustrative embodiment of the present invention, a crash information file 700 is written to the /crash directory 905 in the event of an error condition. The file 700 may be moved to the /pending directory 910 during processing, as described further below in reference to FIG. 8. It should be noted that the /pending and /crash directory names are exemplary only and that any nomenclature may be utilized in accordance with alternative embodiments of the present invention. Further, as will be appreciated by those skilled in the art, the description of crash information file 700 comprising of a file should be taken as exemplary only. In alternative embodiments, the crash information may be stored in any form of data container.

Figure 5:
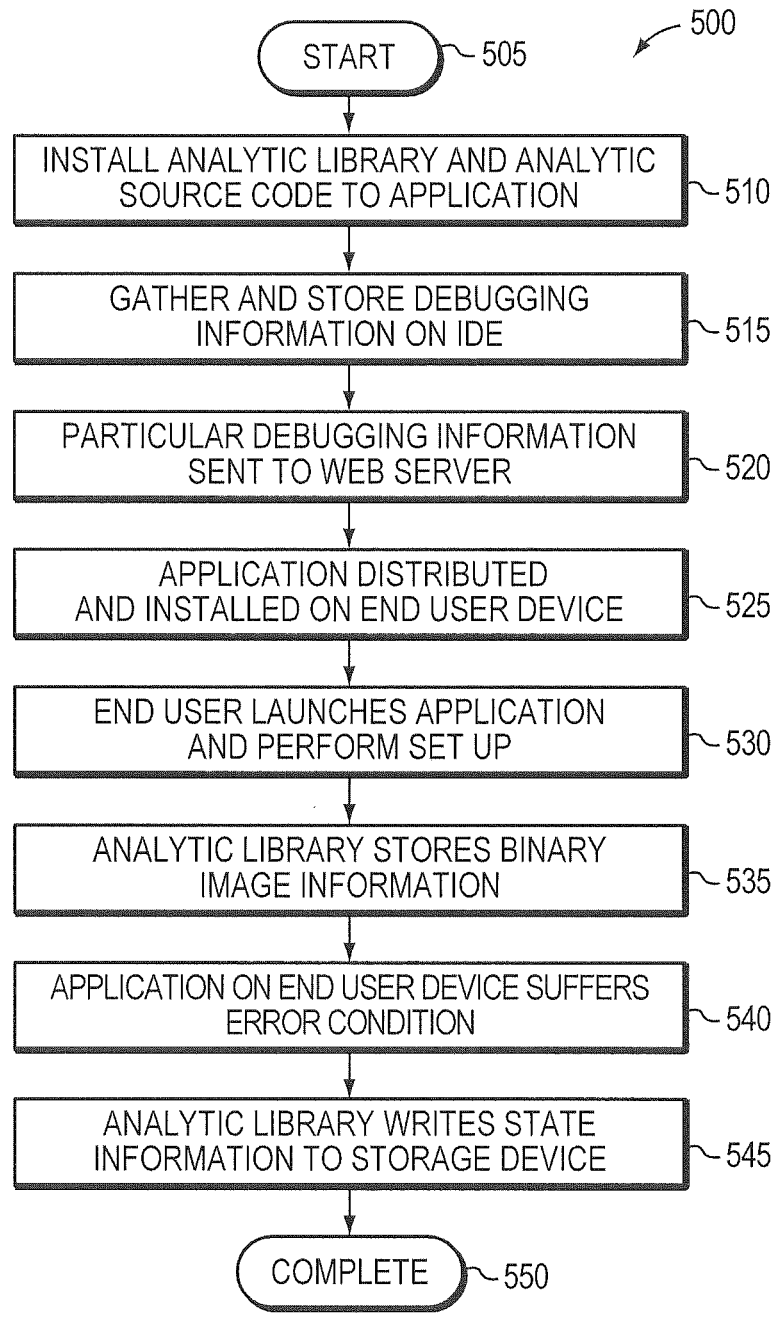
FIG. 5 is a flowchart detailing the steps of an exemplary procedure for collecting error state information in accordance with an illustrative embodiment of the present invention.

FIG. 5 is a flowchart detailing the steps of an exemplary procedure 500 for storing error event information in accordance with an illustrative embodiment of the present invention. The procedure 500 starts at step 505 and continues to step 510 where analytic source code and/or an analytic library is installed within the application on an IDE. In step 515, debugging information (e.g., version number, icon, dSYM file) may be locally stored on the IDE. In step 520, particular debugging information, such as a dSYM file, may be automatically sent over a network, to web server 200, and stored at storage device 115. As explained above, the dSYM is capable of being automatically uploaded or sent to web server 200 due to the installation of the analytic source code an/or analytic library. Specifically, the integration of the analytic source code and/or analytic library may automatically detect when a new dSYM is generated on the IDE, de-duplicate the dSYM based on an identifier, and automatically upload or send the dSYM to the web server. A plurality of different types of messages may be utilized to transmit the particular debugging information from the IDE to the storage device, and other entities as described above in reference to FIG. 1. The particular debugging information is typically generated when the application developer compiles a new version of the application, i.e., a new "build" of the application. For example, and as known by those skilled in the art, a developer may select a particular command, such as a "DWARF with dSYM file", as a Debug Information Format in the build settings of an application (e.g., Xcode). A dSYM may then be generated automatically when the application is compiled. A noted advantage of the developer analytic module is that it is configured to monitor the location where such a dSYM file is stored within the storage space of the developer. As such, the dSYM file may be stored anywhere within the available storage of the developer's site and still be monitored by the developer analytic module. Further, and as described in further detail below, particular debugging information, such as an identifier, extracted from the debugging information that remains resident on the developer's system, is sent to the web server, wherein the identifier is associated with an address of the developer's system (e.g., IP address) and indexed.

In step 525, the application may be distributed and installed on end user devices, such as mobile phones or other entities. For example, the application may be downloaded on the end user device over a cellular network or any other type of network. For example, the application may be available to end users through libraries associated with particular end user devices (e.g., iTunes on an iPhone). The end user may then select the developer's application from the library and download the application on the end user device. The end user may then utilize the application on his/her end user device. In other instances, the application may simply be available on a particular website, that the user may find through conventional web based search techniques. After finding the application, the user may then download the application from the website and utilize the application on the end user device. As is known to those skilled in the art, applications may be available for installation on an end user device through various techniques, and the techniques described above are simply exemplary in nature.

In step 530, the application may be launched, by an end user for example, on the end user device. The end user may then utilize the application that includes the analytic library and/or the analytic software on the end user device. The end user may, for example, go through a series of set up steps associated with whether crash detection and reporting. For example, some user may determine that they do not want to enable crash detection and reporting for privacy reasons or other reasons. In such a case, the user of the end user device may indicate, utilizing a keypad associated with the end user device, that he/she wishes to disable crash detection and reporting on the end user device. Thereafter, for example when network connectivity is obtained (e.g., cell phone network or WIFI network), the preference indicated by the user may be transmitted to the web server. Thereafter, when the application incurs a bug, the crash data may remain on the end user device instead of sending the crash data to web server 200 for analytic processor.

In step 535, the analytic library stores information relating to any binary images, e.g., libraries, in a binary image information storage data structure 600. This information is stored so that it may be later written to storage device 425 and used for debugging purposes. Generally, information relating to all libraries that are being utilized is stored. As the total number of libraries may reach several hundred, an illustrative embodiment of the present invention compresses certain information as it is stored in data structure 600. Further, in accordance with an illustrative embodiment of the present invention, after the data is written to data structure 600, the region of memory containing the data structure 600 is marked as read only. This provides protection against the information contained within data structure 600 from being overwritten by an application suffering an error condition.

Figure 6:
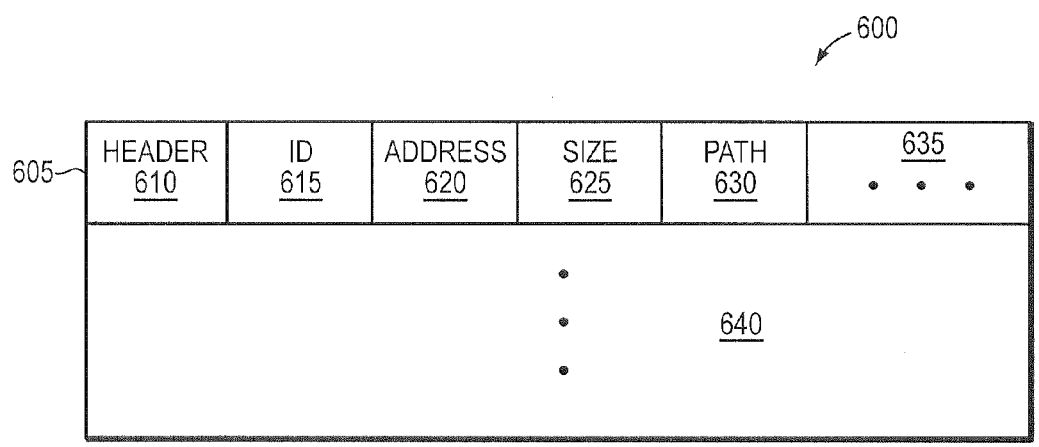
FIG. 6 is schematic block diagram of an exemplary binary image storage and data structure in accordance with an illustrative embodiment of the present invention.

FIG. 6 is an exemplary schematic block diagram of an exemplary binary image storage data structure 600 in accordance with an illustrative embodiment of the present invention. The data structure 600 collectively comprises a plurality of entries 605. Each entry 605 generally comprises a plurality of fields including, for example, the header field 610, an identifier field 615, and address field 620, a size field 625, a path field 630 and, in accordance with alternative embodiments of the present invention, additional fields 635. The header field 610 may contain metadata about the entry including, e.g., the length of the path field 630. The identifier field 615 comprises of a unique identifier associated with a particular binary image. Illustratively, each binary image is associated with a unique identifier. The address field 620 contains the address of the binary image within memory. The size field 625 contains a size of the binary image. The path field 630 contains a path to the library (or other binary image) within a storage device of the mobile device. Illustratively, the path may be compressed by removing a common portion of the address. For example, if all binary images are stored in a common directory, the leading portion of the path address may be disregarded and not included in path field 630. In alternative embodiments, if memory space is at a premium, all fields but the identifier field 615 and address field 620 may be left blank or ignored to conserve memory.

In step 540, the application on the end user device encounters a bug that invokes the analytic library module of the application. For example, the application may crash unexpectedly or may behave in a manner not intended. It should be noted that not every error condition that an application encounters may invoke the error reporting functionality of the analytic library module. Further, it should be noted that not every error condition may be detected. For example, due to a programming error, the application may cause unintended corruption of a portion of the memory of the end user device. Such corruption may not be detected until later when, e.g., the corrupted memory is attempted to be used, either for data or to be executed. In response to the error condition, the analytic library writes the state information to a state information file 700 in step 545. Illustratively, the state information file 700 is written as a series of carriage return delineated lines of machine readable data. In this manner, should a failure occur while trying to write the state information file, those lines that have been written may be utilized for debugging purposes. For example, assume that three lines of machine readable data have been written, but another error error condition occurs during the writing of the fourth line. This error condition may be fatal in that it causes a complete crash of the application and a stoppage of writing of state information. In this case, the first three lines of state information will have been written and will be available in a machine readable format. The fourth line is likely to be corrupted and not machine readable; however, at least a portion of the state information is available for debugging purposes. This differs from conventional debugging systems that attempt to write a complete file that is machine readable at once. In such conventional systems, a failure during writing will result in a file that is corrupt and which provides no useful information for debugging purposes.

FIG. 7 is a schematic block diagram of an exemplary state information file 700 in accordance with an illustrative embodiment of the present invention. Illustratively, the state information file 700 comprises a plurality of lines of data, each of which is terminated with a carriage return 725. It should be noted that in alternative embodiments of the present invention a different line delineation may be utilized. As such, the description of a carriage return 725 is ending each line of data should be taken as exemplary only. Further, it should be noted that in alternative embodiments of the present invention, any form of data structure may be utilized. As such, the description of a file being utilized should be taken as exemplary only.

It should be noted that the contents of the various lines may differ depending on various implementations. As such, the description of the contents of various lines of file 700 contained herein should be taken as exemplary only. In accordance with an illustrative embodiment of the present invention, the lines are ordered from most important to least important for debugging purposes. In this way, if a further error condition occurs during the writing of the various lines to the file 700, the most important information will have been committed and available for debugging operations. Illustrative first line 705 comprises a version field 710, a number of lines field 715 and, in alternative embodiments, additional fields 720. The line 705 is terminated with a carriage return 725. Exemplary second line 730 comprises build information 735 relating to the application. The third line 740 may comprise process information 745, while the fourth line 740 comprises host information 755. Exemplary lower importance line 760 may comprise a storage field 76, a free field 770, a total space field 775 and, in alternative embodiments, additional fields 780. The file 700 may comprise additional fields 785.

In accordance with an illustrative embodiment of the present invention, the file 700 is stored in an exemplary /crash directory 905 within the storage device 425. Once the file 700 is written to storage device 425, the procedure 500 then ends at step 550.

Figure 8:
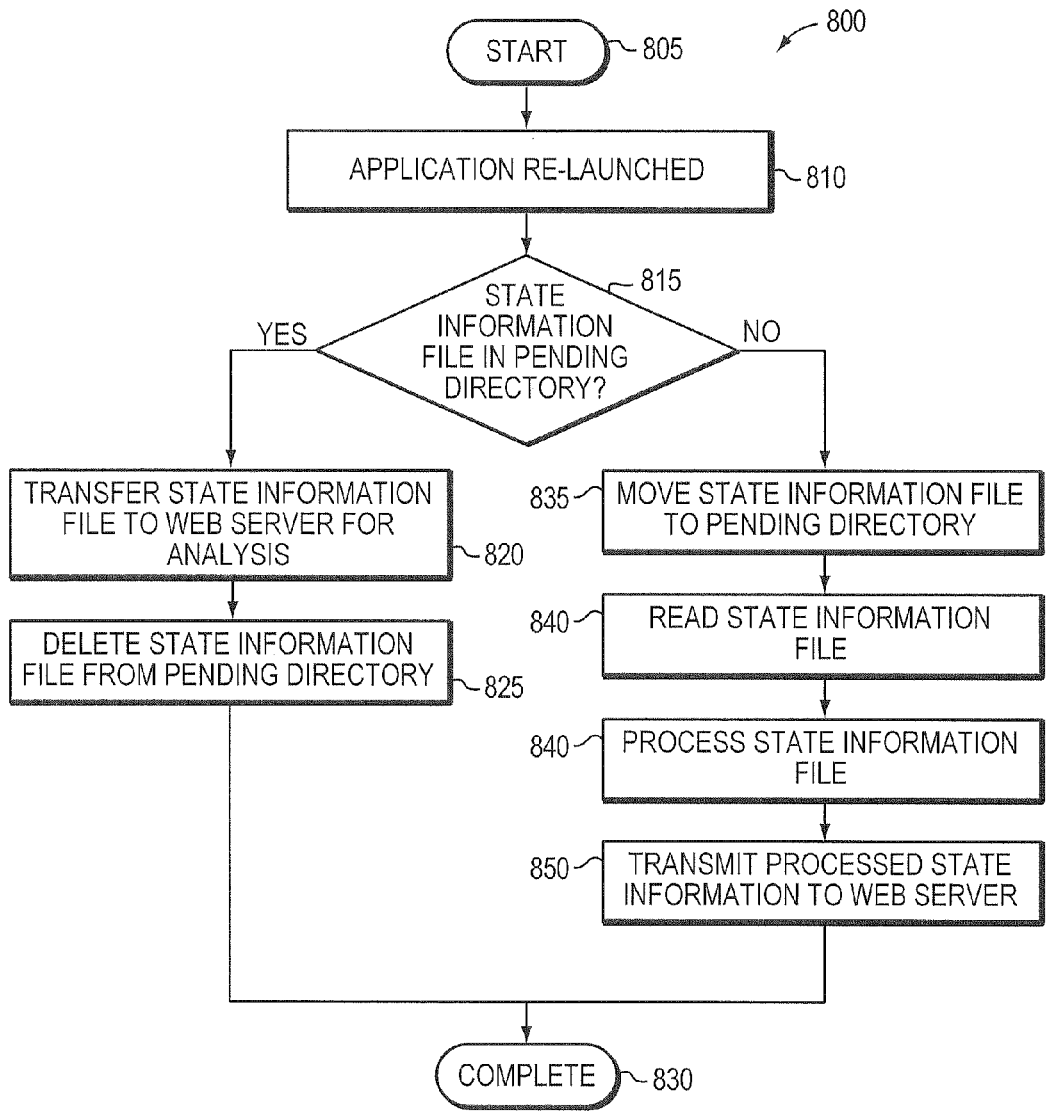
FIG. 8 is a flowchart detailing the steps of a procedure for preventing repeated crashes in accordance with an illustrative embodiment of the present invention.

FIG. 8 is a flowchart detailing the steps of a procedure 800 for preventing repeated error conditions in accordance with an illustrative embodiment of the present invention. The procedure begins in step 805 and continues to step 810 where the application is relaunched following a crash or other error condition. Illustratively, the application is relaunched in step 810 at some point following suffering the error condition in step 540 as described above in relation to FIG. 5. Upon the application being relaunched, the application examines the /pending directory 910 within storage device 425 to determine if a state information file 700 or other data container is stored therein.

If a state information file 700 has been stored in the /pending directory 910, then the application continues to step 820 where it transfers the state information file to the web server 200 for analysis. Once the state information file 700 has been transferred to the web server, the procedure 800 continues to step into 825 where the application deletes the state information file from the /pending directory. The procedure then completes in step 830.

Figure 9:
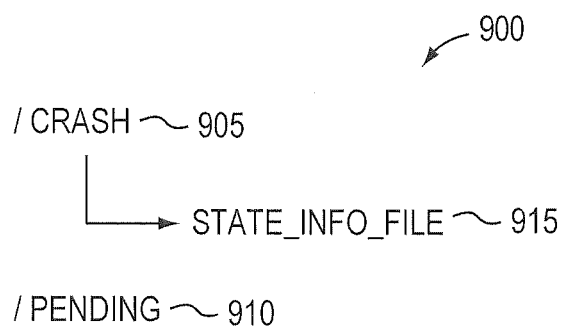
FIG. 9 is the schematic representation of an exemplary directory structure in accordance with an illustrative embodiment of the present invention.
Figure 10:
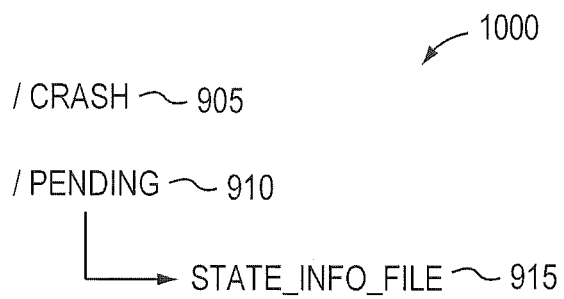
FIG. 10 is a schematic representation of an exemplary directory structure in accordance with an illustrative embodiment of the present action.

However, if in step 815 is determined that no state information file exists within the /pending directory 910, the procedure branches to step 835 where the state information file is moved from the /crash directory 905 to the /pending directory 910. FIG. 9 is an exemplary schematic diagram of a directory structure 900 in accordance with an illustrative embodiment of the present invention. Within directory structure 900, is an exemplary state information file 915 stored in a /crash directory 905. The /pending directory 910 illustratively contains no files. As a result of step 835, the state information file 915 is moved from the /crash directory 905 to the /pending directory 910. The end result is shown in FIG. 10, which is a schematic block diagram of an exemplary directory structure 1000 in accordance with an illustrative embodiment of the present invention. Returning to the description of procedure 800 described in relation to FIG. 8, the procedure 800 continues to step 840, where the application reads the state information file. Once the state information file has been read, the application then processes the state information file in step 845. Once the state information file has been processed, the processed state information is then transmitted to the web server in step 850. The procedure 800 then completes in step 830.

It should be noted that the various descriptions and embodiments described herein are exemplary only. The aspects of the invention may be implemented in software, such as a non-transitory computer readable medium, hardware, firmware or any combination thereof. Further, while this description is written in reference to particular operating systems and/or IDEs, one skilled in the art will appreciate that the functionality may be implemented in differing environments. As such, the description of a MacOS environment should be taken as exemplary only.

What is claimed is:

1. A method comprising:

executing an application on an end user device;

detecting a first error condition affecting the application;

writing state information to a state information data container, wherein the state information includes a plurality of entries of machine readable data, each entry of the plurality of entries of machine readable data being terminated by a specified character, whereby at least a portion of the state information is retrievable if a second error condition occurs during the writing of the state information;

re-executing the application on the end user device;

determining whether the state information data container is stored in a crash directory; and in response to determining that the state information data container is stored in the crash directory:

moving the state information data container to a pending directory;

reading the state information from the state information data container; and transmitting the state information to an analytic processing provider.

2. The method of claim 1 wherein the plurality of entries of machine readable data are written in a predefined order of importance.

3. The method of claim 1 wherein the state information data container is stored in the crash directory.

4. The method of claim 1 further comprising:
determining whether the state information data container is stored in the pending directory; and
in response to determining that the state information data container is stored in the pending directory:
transferring the state information data container to the analytic processing provider; and
deleting the state information data container from the pending directory.

5. The method of claim 1 wherein the specified character comprises a carriage return.

6. The method of claim 1 further comprising:
storing binary image information in a binary image information storage data structure.

7. The method of claim 6 further comprising marking, as read only, a region of memory of the end user device storing the binary image information storage data structure.

8. A system comprising:
an end user device having a processor;
an application executing on the processor, the application including an analytic library module wherein the analytic library module is configured to:
detect a first error condition associated with the application and further configured to, in response to detecting the first error condition, write state information to a state information data container,
wherein the state information includes a plurality of entries of machine readable data, each entry of the plurality of entries of machine readable data being terminated by a specified character so that, in response to a second error condition occurring during the writing of the state information, at least a portion of the state information is retrievable; and
the processor configured to:
re-execute the application on the end user device,
determine whether the state information data container is stored in a crash directory, and
in response to determining that the state information data container is stored in the crash directory:
move the state information data container to a pending directory;
read the state information from the state information data container, and
transmit the state information to an analytic processing provider.

9. The system of claim 8 wherein the plurality of entries of machine readable data are written in a predefined order of importance.

10. The system of claim 8 wherein the specified character comprises a carriage return.

11. The system of claim 8 wherein the analytic library module is further configured to write the plurality of entries of machine readable data in a predefined order of importance.

12. The system of claim 8 wherein the analytic library module is further configured to store binary image information in a binary image information storage data structure, wherein the binary image information storage data structure is stored in memory of the end user device.

13. The system of claim 12 wherein the analytic library module is further configured to mark a region of the memory storing the binary image information storage data structure as read only.

14. The system of claim 12 wherein the binary image information is stored in a compressed format in the binary image information storage data structure.

15. The system of claim 8 wherein the analytic library module is further configured to process a previously stored state information data container that is stored on the storage device.

16. The system of claim 15 wherein the analytic library module processes the previously stored state information data container by transferring the previously stored state information data container to the analytic processing provider.

17. The system of claim 15 wherein the analytic library module processes the previously stored state information data container by moving the previously stored state information data container from a first directory to a second directory.

18. A non-transitory computer readable medium comprising instructions for storing state information, the instructions, when executed by at least one processor, comprising functionality to:
detect a first error condition affecting an application executing on the at least one processor; and
write the state information to a state information data container, wherein the state information data container includes a plurality of entries of machine readable data, each entry of the plurality of entries of machine readable data being terminated by a specified character, whereby at least a portion of the state information is retrievable if a second error condition occurs during the writing of the state information;
re-execute the application on the end user device;
determine whether the state information data container is stored in a crash directory; and
in response to determining that the state information data container is stored in the crash directory:
move the state information data container to a pending directory,
read the state information from the state information data container, and
transmit the state information to an analytic processing provider.

19. The non-transitory computer readable medium of claim 18 wherein the plurality of entries of machine readable data are written in a predefined order of importance.

20. The non-transitory computer readable medium of claim 18 wherein the specified character comprises a carriage return.

* * * * *